United States Patent
Elliott

(10) Patent No.: US 6,571,832 B1
(45) Date of Patent: Jun. 3, 2003

(54) CASING SPACER

(75) Inventor: Jerry E. Elliott, Aurora, IL (US)

(73) Assignee: Cascade Waterworks Manufacturing Co., Yorkville, IL (US)

( * ) Notice: Subject to any disclaimer, the term of this patent is extended or adjusted under 35 U.S.C. 154(b) by 0 days.

(21) Appl. No.: 10/215,401

(22) Filed: Aug. 8, 2002

(51) Int. Cl.[7] .............................................. F16L 55/00
(52) U.S. Cl. ...................... 138/108; 138/112; 138/114; 138/148
(58) Field of Search ................................ 138/108, 112, 138/114, 159, 148

(56) References Cited

U.S. PATENT DOCUMENTS

| | | | |
|---|---|---|---|
| 1,931,694 A | 10/1933 | Hall | 138/159 |
| 2,868,230 A | 1/1959 | Stokes | 138/65 |
| 2,890,724 A | 6/1959 | Kennedy, Jr. | 138/65 |
| 2,896,669 A | 7/1959 | Broadway et al. | 138/65 |
| 2,938,569 A | 5/1960 | Goodrich | 154/41 |
| 3,540,487 A | 11/1970 | LoRusso | 138/112 |
| 3,789,129 A * | 1/1974 | Ditscheid | 138/113 |
| 3,882,382 A * | 5/1975 | Johnson | 138/104 |
| 3,996,414 A * | 12/1976 | Artbauer et al. | 174/28 |
| 4,095,041 A * | 6/1978 | Netzel et al. | 138/114 |
| 4,100,367 A * | 7/1978 | Netzel | 138/114 |
| 4,182,378 A | 1/1980 | Dieter | 138/112 |
| 4,233,816 A * | 11/1980 | Hensley | 138/112 |
| 4,280,535 A | 7/1981 | Willis | 138/112 |
| 4,455,112 A | 6/1984 | Anders | 406/110 |
| 4,896,701 A | 1/1990 | Young | 138/108 |
| 5,069,255 A | 12/1991 | Muszynski | 138/113 |
| 5,441,082 A * | 8/1995 | Eskew et al. | 138/112 |
| 5,592,975 A * | 1/1997 | Wissmann et al. | 138/112 |
| 5,934,334 A * | 8/1999 | Gray, Jr. et al. | 138/112 |
| 6,003,559 A * | 12/1999 | Baker | 138/108 |
| 6,161,589 A * | 12/2000 | Bolotte et al. | 138/106 |

* cited by examiner

Primary Examiner—James Hook
(74) Attorney, Agent, or Firm—Emrich & Dithmar

(57) ABSTRACT

A casing spacer disposed between and engaging an inner carrier pipe and an outer casing maintains separation between and alignment of the carrier pipe and the casing. The casing spacer includes plural connected shell members, or segments, disposed about and engaging an outer surface of a carrier pipe and an inner surface of the casing. Each shell member includes one or more non-slip members engaging the carrier pipe to prevent movement of the casing spacer along the carrier pipe/casing combination. Each shell member is comprised of a high-strength, pliable material permitting shell members of different sizes to be connected together in a single casing spacer to accommodate a wide range of carrier pipe circumferences. The shell members are connected by plural nut and bolt couplers, with each shell member further including tapered coupling apertures and plural connector flanges to facilitate assembly and installation.

21 Claims, 3 Drawing Sheets

CASING SPACER

FIELD OF THE INVENTION

This invention relates generally to fluid carrying pipe arrangements and is particularly directed to a casing spacer for maintaining proper spacing between an inner carrier pipe and an outer casing.

BACKGROUND OF THE INVENTION

In pipelines it is frequently necessary to position one or more pipes carrying a liquid medium within a rigid outer casing. This carrier pipe within an outer casing arrangement is frequently provided for water and sewer mains within highway and railroad crossing pipe casings to maintain carrier pipe alignment, restrain the carrier pipe against flotation or other movement, or maintain the carrier pipe in a fixed position and orientation such as per grade requirements in the case of a gravity sewer.

One prior approach to positioning a carrier pipe within an outer casing involves banding wooden skids to the outer periphery of the carrier pipe with steel straps. This approach is undesirable in that it requires at least two workers to attach the wooden skids to the carrier pipe, is cumbersome and time consuming to install, and frequently results in the catching of the wooden skids on welded beads resulting in rotation of the carrier pipe and destabilizing of its joints. The wooden skids and steel straps are subject to breaking, making removal and reinstallation necessary. These banded wooden skids have generally been replaced by casing spacers comprised of stainless steel, galvanized steel, or epoxy coated steel. This type of casing spacer typically includes upper and lower semi-circular shell members coupled together along their adjacent edges by means of plural nut and bolt combinations inserted through flanges on adjacent edges of the casing spacer's shell members. Disposed about the outer peripheries of the shell members in a spaced manner are plural risers which maintain the carrier pipe in a fixed orientation and in spaced position from the outer casing as well as from other pipes within the casing. This approach also suffers from limitations such as the limited gripping engagement of the carrier pipe by the casing spacer allowing the spacer to move along the length of the carrier pipe resulting in reduced support and position stability for the carrier pipe. In addition, the one-half sections of the casing spacer are sized to accommodate a carrier pipe having a specific circumference requiring another casing spacer with different sized shell members to accommodate a carrier pipe of a different size. Finally, this latter approach, while easier to install and more reliable than earlier banded wooden skids casing spacers, still requires two workers and a considerable amount of time for installation.

The present invention addresses the aforementioned limitations of the prior art by providing a casing spacer comprised of a high-strength, pliable material which is capable of securely maintaining an inner carrier pipe in fixed position within an outer casing. The present casing spacer is comprised of plural connected shell members disposed about and engaging the outer surface of the carrier pipe, where shell members of different sizes may be incorporated in the casing spacer to accommodate a wide range of carrier pipe circumferences.

OBJECTS AND SUMMARY OF THE INVENTION

Accordingly, it is an object of the present invention to facilitate the positioning of a carrier pipe within an outer casing.

It is another object of the present invention to provide a casing spacer comprised of plural connected shell members for positioning between an inner carrier pipe and an outer casing which is adapted for use with and attachment to carrier pipes having a wide range of outer circumferences by using, in combination, spacer shell members of different sizes.

A further object of the present invention is to provide a casing spacer comprised of a lightweight, high-strength, pliable material which is easily assembled and installed between an inner carrier pipe and an outer casing.

Yet another object of the present invention is to provide a casing spacer for use between an inner carrier pipe and outer casing which has a low coefficient of friction to facilitate its installation and includes one or more non-slip members for securely engaging the outer surface of the carrier pipe in a fixed manner when installed.

The present invention contemplates a casing spacer disposed between and engaging an inner carrier pipe carrying a fluid material and an outer casing having a generally circular cross section, the casing spacer comprising plural shell members each having an arcuate inner portion disposed about and engaging the carrier pipe and risers disposed on and extending outward from said arcuate inner portion for engaging the outer casing; a coupling for connecting the plural shell members and maintaining the plural shell members in fixed, spaced position about the carrier pipe, wherein the casing spacer maintains the carrier pipe in fixed position within and spaced from the outer casing; and a positioning member attached to an arcuate inner portion of at least one of the shell members for frictionally engaging the carrier pipe and maintaining the casing spacer in a fixed position on the carrier pipe.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
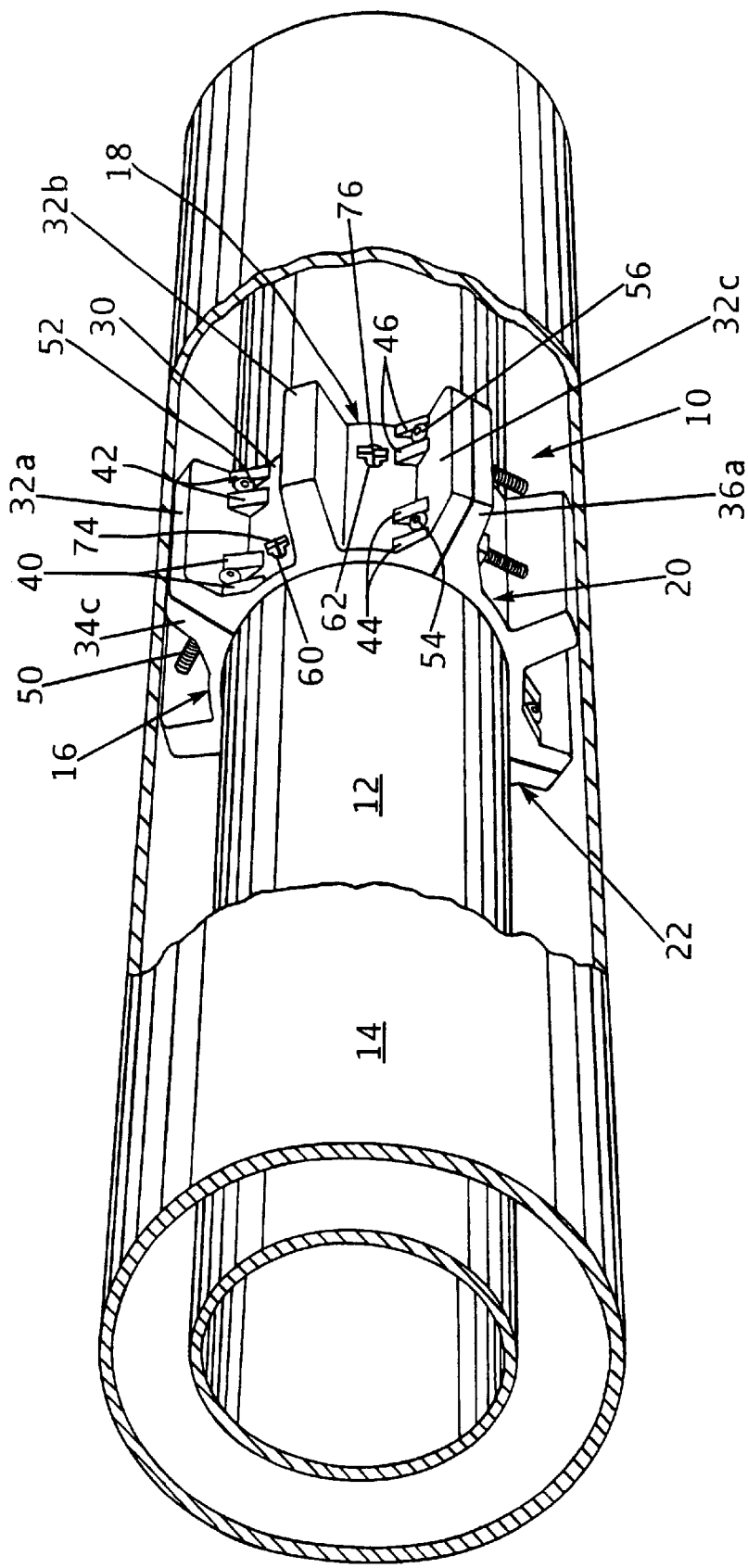
FIG. 1 is a partially cutaway perspective view of a casing spacer in accordance with the present invention shown disposed between and engaging an inner carrier pipe and an outer casing.

Referring to FIG. 1, there is shown a partially cutaway perspective view of a casing spacer 10 in accordance with the present invention engaging and disposed between an inner carrier pipe 12 and an outer casing 14. Carrier pipe 12 and outer casing 14 each have a generally circular cross-section. Casing 14 is typically comprised of steel, but may also be comprised of iron, concrete, fiberglass, plastic or other high-strength materials. Carrier pipe 12 may be comprised of steel, stainless steel, iron, concrete, fiberglass, asbestos/cement, plastic, or a combination of these and other materials.

Referring to FIG. 1 as well as to FIG. 3, which is a transverse sectional view of the inventive casing spacer 10, carrier pipe 12 and outer casing 14 combination, additional details of the inventive casing spacer will now be described. Casing spacer 10 includes four shell members of the same size and configuration. The shell members comprising casing spacer 10 include first, second, third and fourth shell members 16, 18, 20 and 22 disposed in a spaced manner about the inner carrier pipe 12. The second shell member 18 is shown in a perspective view in FIG. 2 and will now be described in detail, it being understood that the remaining three shell members are similarly sized and configured. The second shell member 18 includes an arcuate inner portion 30, the inner surface of which engages the outer surface of a portion of the carrier pipe 12. In the example shown in FIGS. 1, 2 and 3, each of the casing spacer's shell members is disposed about one quarter of the circumference of the inner carrier pipe 12. Thus, the inner portion 30 of the second shell member 18, and the inner portions of the remaining three shell members, each subtend an arc of approximately 90°.

Disposed in a spaced manner and extending outwardly from the outer surface of the second shell member's inner portion 30 are first, second and third risers 32a, 32b and 32c. The second riser 32b is equally spaced from the first and third risers 32a and 32c. In a preferred embodiment, the first, second and third risers 32a, 32b and 32c are formed integrally with the inner portion 30 of the second shell member 18 which is preferably comprised of a high-strength, pliable plastic material. Disposed on opposed, outer edges of the casing spacer's arcuate inner portion 30 are first and second edge rings 30a and 30b for reinforcing the casing spacer 10.

Disposed in the two end risers, or the first and third risers 32a and 32c, are respective pairs of coupling apertures. Thus, an inner portion of the first riser 32a is provided with paired first and second coupling apertures 66 and 68, while an inner portion of the third riser 32c is provided with paired third and fourth coupling apertures 70 and 72. Adjacent shell members are similarly provided with respective pairs of coupling apertures, where adjacent pairs of coupling apertures of adjacent shell members are in common alignment when the shell members are assembled. Thus, a pair of coupling apertures (not shown in FIG. 1 for simplicity) disposed within a riser 34c of the first shell member 16 are disposed in alignment with the first and second coupling apertures 66, 68 within the first riser 32a of the second shell member 18. One set of aligned coupling apertures in risers 34c and 32a is adapted to receive a first nut and bolt combination 50, while a second pair of aligned coupling apertures in these risers is adapted to receive a second nut and bolt combination 52 as shown in FIG. 1. The bolts in each of the nut and bolt combinations 50, 52 is provided with an Allen-type opening in its head portion for tightening by means of an Allen wrench. The nut portion of the nut and bolt combinations 50, 52 is in the form of a square knot. Each of the square knots in the nut and bolt combinations 50, 52 is adapted for positioning between a pair of connector flanges (not shown for simplicity) disposed near the base of riser 32c. All of the shell members are provided with plural pairs of connector flanges as shown for the case of the second shell member 18. Thus, the second shell member 18 is provided with first, second, third and fourth pairs of connector flanges 40, 42, 44 and 46. Each pair of connector flanges is adapted to receive and engage a respective square nut in a nut and bolt combination for maintaining the nut in fixed position while threadably engaged by its associated bolt. This facilitates insertion and tightening of a bolt in its associated nut. The paired connector flanges in each of the shell members of casing spacer 10 thus facilitate assembly and installation of the casing spacer between the inner carrier part 12 and outer casing 14.

Figure 2:
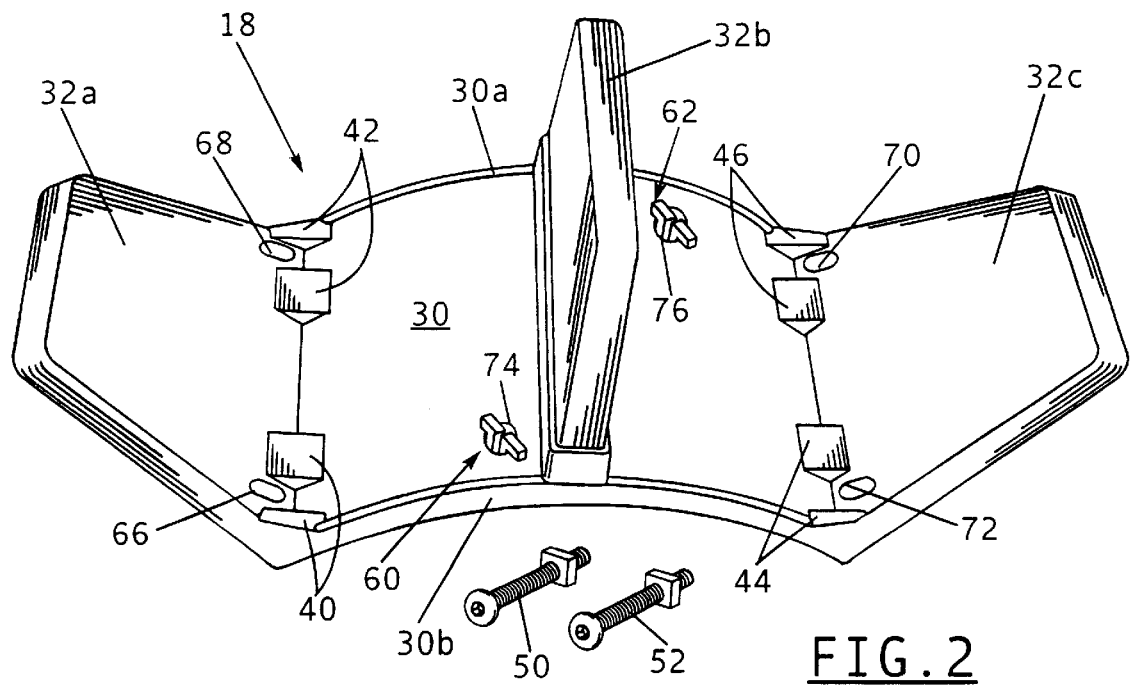
FIG. 2 is a perspective view of a shell member used in the casing spacer of the present invention shown in FIG. 1.
Figures 4, 5:
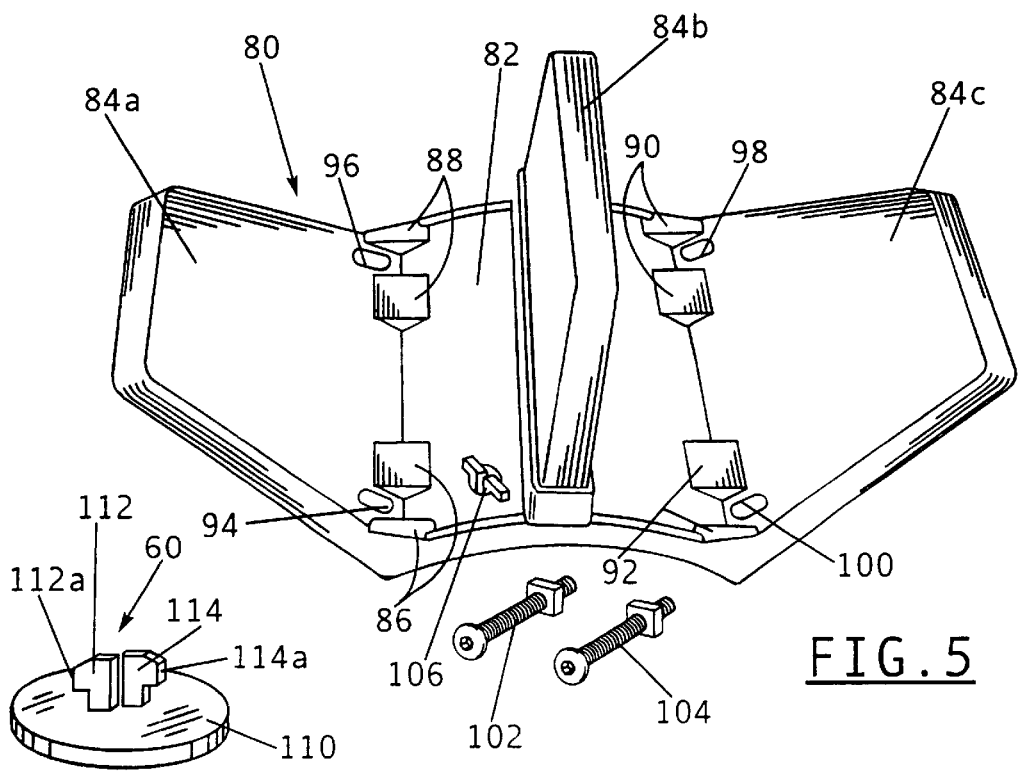
FIG. 4 is a perspective view of a non-slip member used in the casing spacer of the present invention for maintaining the casing spacer in fixed position between an inner carrier pipe and an outer casing.
FIG. 5 is a perspective view of a shell member such as used in the inventive casing spacer having a size different than the shell member shown in FIG. 2.
Figure 6:
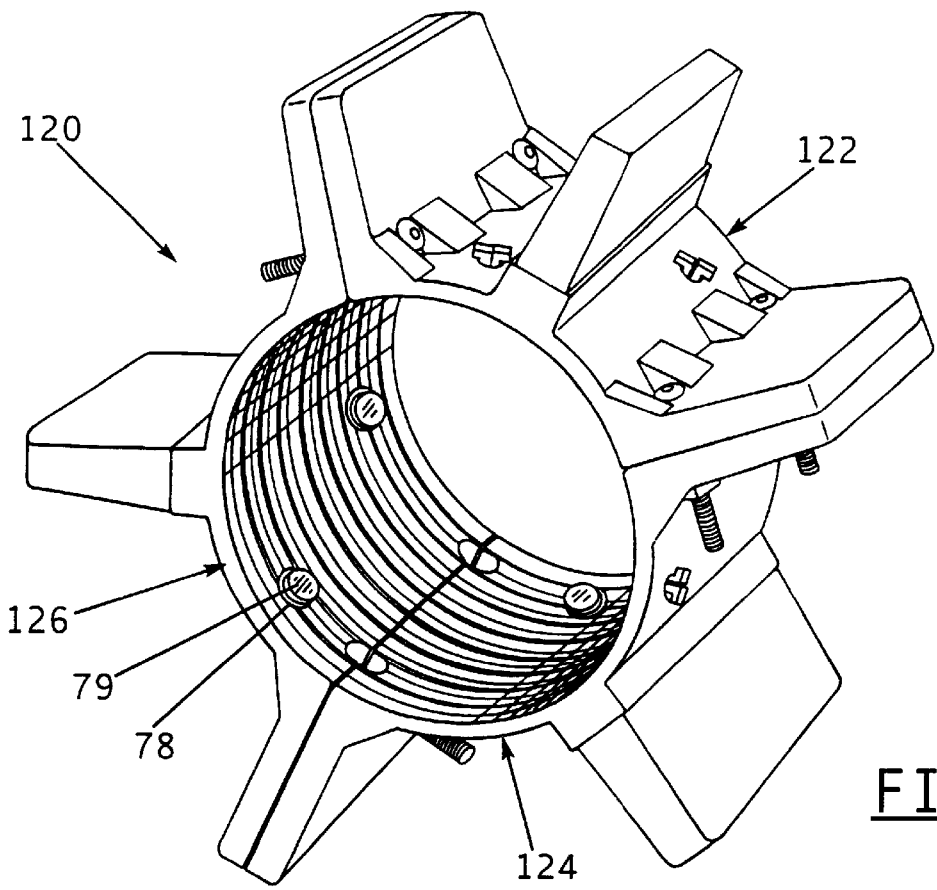
FIG. 6 is a perspective view of a casing spacer comprised of shell members of different sizes in accordance with one aspect of the present invention.
Figure 3:
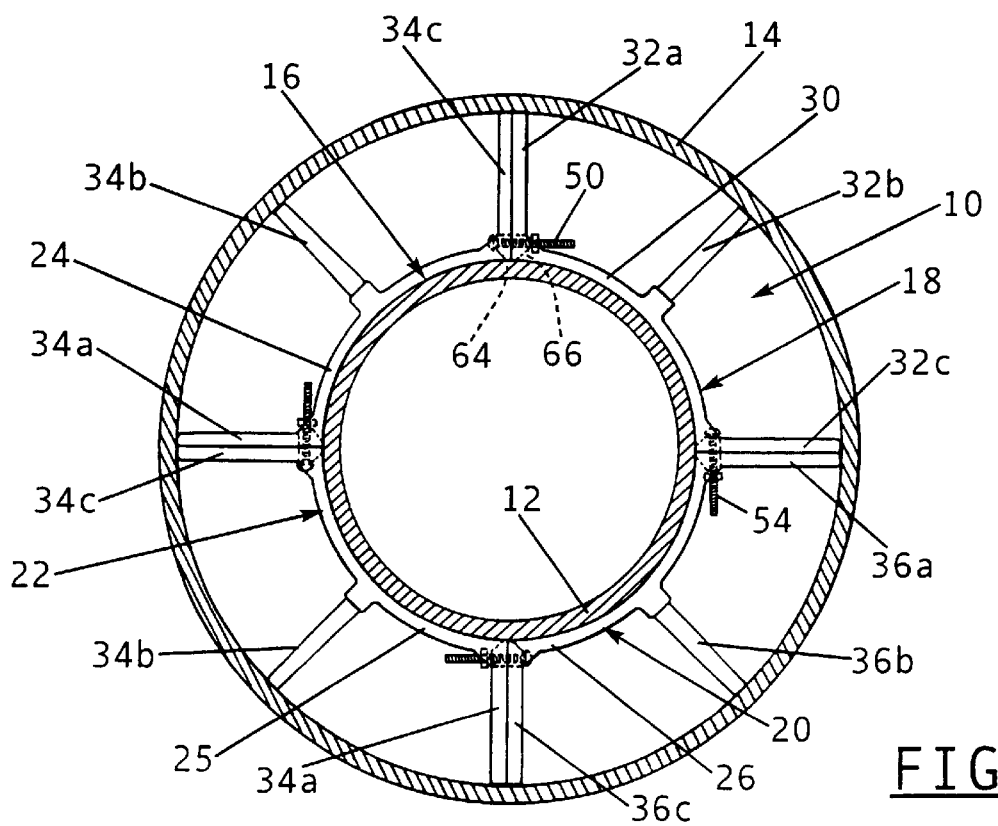
FIG. 3 is a transverse sectional view of the inventive casing spacer arrangement shown in FIG. 1.

In accordance with another aspect of the present invention, the inner portion of each shell member includes one or more apertures such as shown in FIGS. 1 and 2 for the case of apertures 74 and 76 in the inner portion 30 of the second shell member 18. Disposed in aperture 74 is a first non-slip member 60, while disposed in aperture 74 is a second non-slip member 62. A perspective view of the first non-slip member 60 is shown in FIG. 4. Non-slip member 60 includes a disc-shaped base 110 attached to which are first and second retaining members 112 and 114. The first and second retaining members 112, 114 are preferably integrally formed with the disc-shaped base 110 of the non-slip member 60, which in a preferred embodiment is comprised of a material which is pliable and possesses a relatively high surface coefficient of friction. The disc-shaped base of each non-slip member is inserted in a generally circular recessed portion 78 on the inner surface of the shell member's arcuate inner portion as shown in FIG. 6 for non-slip member 79. Examples of materials for use in the non-slip members of the present invention include plastics and rubber having these characteristics, such as thermo plastic rubber which is adapted to frictionally engage pipes having a wide range of compositions and which is particularly adapted for securely engaging pipes comprised of polyvinyl chloride (PVC). The non-slip members disposed in the shell members of each of the casing spacers 10 of the present invention prevent displacement of the casing spacer along the length of the carrier pipe 12, thus maintaining the casing spacer in fixed position between the carrier pipe and outer casing 14. This arrangement maintains the carrier pipe 12 in fixed position and orientation along its entire length within the outer casing 14. Casing spacers in accordance with the present invention are preferably spaced within two (2) feet of each end of the outer casing, with the remaining casing spacers spaced every eight (8) feet along the length of the carrier pipe 12.

Each of the first and second retaining members 112, 114 extending from the disc-shaped base 110 of the non-slip member 60 includes a respective projection 112a and 114a on its distal end as shown in the perspective view of FIG. 4. With the non-slip member 60 comprised of a flexible, pliant material, the first and second retaining members 112, 114 may be displaced either toward or away from one another by engaging with one's fingers. In this manner, the first and second retaining members 112 and 114 may be moved towards one another when inserting the non-slip member 60 through an aperture within a casing spacer's shell member to permit passage of the retaining members 112a, 114a into and through the aperture. With the retaining member's disc-shaped base 110 disposed in contact with a first side of a casing spacer shell member and with retaining member projections 112a and 114a disposed on an opposed side of the shell member, the two retaining members may then be released, allowing the retaining member projections to engage the opposed side of the shell member to prevent removal of the non-slip member 60 from an aperture in the inner portion of a casing spacer's shell member while the retaining member's base 110 is described herein as being disc-shaped, the base is not limited to this shape and may assume virtually any geometric shape.

Referring to FIG. 5, there is shown another casing space shell member 80 in accordance with the present invention which is smaller in size than the shell member 18 shown in FIG. 2. As in the previously described shell member, shell member 80 includes first, second and third spaced risers 84a, 84b and 84c attached to and extending from an arcuate inner portion 82. Disposed in the first riser 84a are a first pair of spaced coupling apertures 94 and 96, while disposed in the third riser 84c are spaced third and fourth coupling apertures 98 and 100. Disposed adjacent to and on respective sides of the first coupling aperture 94 are a first pair of connector flanges 86, while disposed adjacent to and on respective sides of the second coupling aperture 96 are a second pair of connector flanges 88. Similarly, disposed at the juncture of the casing spacer's arcuate inner portion 82 and its third riser 84c are a third pair of connector flanges 90 positioned adjacent to and on respective sides of the third coupling aperture 98, and a fourth pair of connector flanges 92 disposed adjacent to and on respective sides of the fourth coupling aperture 100. Shell member 80 is adapted for coupling to adjacent shell members (not shown in the figure for simplicity) by means of respective nut and bolt combinations inserted through the aforementioned coupling apertures, where nut and bolt combinations 102 and 104 are shown in the figure. In addition, at least one non-slip member 106 is inserted through an aperture in the casing spacer's arcuate inner portion 82 to prevent the displacement of the casing spacer along the length of the inner carrier pipe (also not shown in the figure) to which it is connected. Another aspect of the present invention permits various sized casing spacer shell members such as shown in FIGS. 2 and 5 to be joined about a carrier pipe so as to form a single casing spacer. The capability to employ different sized shell members in a single casing spacer in accordance with this aspect of the present invention permits the inventive casing spacers to be used with carrier pipes having a wide range of circumferences without requiring the stocking of a large number of casing spacer shell members because individual shell members of a given size can be used with a range of carrier pipe sizes.

This aspect of the present invention is best shown in FIG. 6 which is a perspective view of a casing spacer in accordance with the present invention incorporating different sized shell members. Casing spacer 120 includes first, second and third shell members 122, 124 and 126 which are configured and connected together as previously described. As can be seen in FIG. 6, the second and third shell members subtend an angle of approximately 135° about a carrier pipe (not shown in the figure for simplicity) with which it is intended for use. The first shell member 122 subtends an arc of approximately 90°. Thus, in accordance with this aspect of the present invention different sized shell members may be combined in forming a single casing spacer, with the size and number of the shell members determined by the circumference of the inner carrier pipe. By permitting variously sized shell members to be combined with each other to form a single casing spacer, the number of different sized shell members required to accommodate the full range of carrier pipe circumferences is reduced. This, in turn, reduces the number of different sized shell members required to accommodate the full range of carrier pipe circumferences, thus also reducing the cost of providing and installing these types of casing spacers.

With reference to the transverse sectional view of FIG. 3, another aspect of the present invention will now be described. As shown in FIG. 3, one of the nut and bolt combinations 50 coupling the first and second shell members 16 and 18 is inserted through aligned apertures 64 and 66 in these shell members. From FIG. 3, it can be seen that the inner portions of the coupling apertures, including coupling apertures 64 and 66, in each of the first, second, third and fourth shell members 16, 18, 20 and 22 are oriented at an acute angle to a tangent of the inner carrier pipe 12 at that location so as to form a generally V-shaped groove. The angled inner portion of each of the coupling apertures allows various sized shell members to be used together in forming a single casing spacer while facilitating the insertion of a nut and bolt combination through an aligned pair of coupling apertures in adjacent shell members. The angled inner portion of each of the coupling apertures within the casing spacer's shell members thus allows for the use of variously sized shell members with a wide range of carrier pipe circumferences.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A casing spacer disposed between and engaging an inner carrier pipe carrying a fluid material and an outer casing having a generally circular cross section, said casing spacer comprising:

plural shell members each having an arcuate inner portion disposed about and engaging the carrier pipe and riser means disposed on and extending outward from said arcuate inner portion for engaging the outer casing;

coupling means for connecting said plural shell members and maintaining said plural shell members in fixed, spaced position about the carrier pipe, wherein said casing spacer maintains the carrier pipe in fixed position within and spaced from the outer casing; and positioning means inserted in a portion of an arcuate inner surface of at least one of said shell members for frictionally engaging a portion of an outer circumferential surface of the carrier pipe and maintaining said casing spacer in fixed position on the carrier pipe.

2. The casing spacer of claim 1 wherein the arcuate inner portion of said at least one of said shell members includes an aperture and wherein said positioning means is disposed in said aperture.

3. The casing spacer of claim 2 wherein said positioning means comprises a non-slip member having a base disposed adjacent an inner surface of the arcuate inner portion of said at least one of said shell members and engaging the carrier pipe, said positioning means further including retaining means coupled to said base and extending through said aperture for engaging an outer, opposed surface of said arcuate inner portion.

4. The casing spacer of claim 3 wherein said retaining means comprises plural elongated members movable between a first position for engaging said arcuate inner portion of said at least one of said shell members for maintaining said non-slip member in fixed position in said arcuate inner portion and a second position in non-engagement with said arcuate inner portion for permitting removal or replacement of said non-slip member in said at least one of said shell members.

5. The casing spacer of claim 4 wherein each of said plural elongated members includes a respective projection thereon for engaging an outer surface of the inner arcuate portion of said at least one of said shell members for maintaining said non-slip member in fixed position therein.

6. The casing spacer of claim 3 wherein said base is disc-shaped.

7. The casing spacer of claim 6 wherein an inner surface of the arcuate inner portion of said at least one of said shell members includes a generally circular recessed portion for receiving the disc-shaped base of said non-slip member in a tight-fitting manner.

8. The casing spacer of claim 3 wherein said non-slip member is comprise of pliable material having a high surface coefficient of friction.

9. The casing spacer of claim 8 wherein said non-slip member is comprised of thermo plastic rubber.

10. The casing spacer of claim 1 wherein the arcuate inner portion of said at least one of said shell members includes plural apertures and said positioning means comprises plural nonslip members each disposed within a respective one of said apertures.

11. The casing spacer of claim 1 wherein each of said shell members includes at least one aperture and wherein apertures in adjacent shell members are in common alignment when said shell members are disposed about and engage the carrier pipe for receiving said coupling means for connecting said shell members.

12. The casing spacer of claim 11 wherein said coupling means comprises at least one nut and bolt combination inserted through aligned apertures in adjacent shell members.

13. The casing spacer of claim 12 further comprising connector flanges disposed adjacent an aperture in a shell member for engaging and retaining in position a nut of one of said nut and bolt combinations for facilitating coupling of adjacent shell members in assembling of said casing spacer on the carrier pipe.

14. The casing spacer of claim 13 wherein said connector flanges include a pair of connector flanges disposed on opposed sides of and in closely spaced relation to an aperture in a shell member.

15. The casing spacer of claim 14 wherein each pair of connector flanges is coupled to and extends between the arcuate inner portion and a riser means of a shell member.

16. The casing spacer of claim 1 wherein the arcuate inner portions of first and second shell members are pliable, have different radii of curvature, and subtend angular arcs of different magnitude about the carrier pipe.

17. The casing spacer of claim 16 wherein said shell members are comprised of a high-strength plastic or rubber.

18. The casing spacer of claim 17 wherein each of said shell members includes at least one aperture and wherein said apertures in adjacent shell members are in common alignment when said shell members are disposed about and engage the carrier pipe for receiving said coupling means for connecting said shell members.

19. The casing spacer of claim 18 wherein said coupling means comprises at least one nut and bolt combination inserted through aligned apertures in adjacent shell members.

20. The casing spacer of claim 19 wherein each of said apertures is tapered to facilitate insertion of a bolt through aligned apertures in adjacent shell members.

21. A casing spacer disposed between and engaging an inner carrier pipe carrying a fluid material and an outer casing having a generally circular cross section, said casing spacer comprising:

plural shell members each having an arcuate inner portion disposed about and engaging the carrier pipe and riser means disposed on and extending outward from said arcuate inner portion for engaging the outer casing;

coupling means for connecting said plural shell members and maintaining said plural shell members in fixed, spaced position about the carrier pipe, said coupling means including at least one nut and bolt combination inserted through aligned apertures in adjacent shell members, wherein each of said apertures is tapered to facilitate insertion of a bolt through aligned apertures in adjacent shell members, and wherein said casing spacer maintains the carrier pipe in fixed position within and spaced from the outer casing; and positioning means attached to an arcuate inner portion of at least one of said shell members for frictionally engaging the carrier pipe and maintaining said casing spacer in fixed.

* * * * *

UNITED STATES PATENT AND TRADEMARK OFFICE
CERTIFICATE OF CORRECTION

PATENT NO.    : 6,571,832 B1
DATED         : June 3, 2003
INVENTOR(S)   : Jerry E. Elliott It is certified that error appears in the above-identified patent and that said Letters Patent is hereby corrected as shown below:

Column 7,
Line 26, delete the word "nonslip" and insert -- non-slip -- in its place.

Column 8,
Line 45, after the word "fixed" add the words -- position on the carrier pipe --.

Signed and Sealed this

Seventh Day of October, 2003

JAMES E. ROGAN
*Director of the United States Patent and Trademark Office*